United States Patent
Sierak et al.

(10) Patent No.: US 9,957,942 B2
(45) Date of Patent: May 1, 2018

(54) DEVICE FOR VOLTAGE STABILIZATION IN A MOTOR VEHICLE

(71) Applicant: Flextronics International Kft., Tab (HU)

(72) Inventors: Thaddaus Sierak, Augsburg (DE); Eckhardt Nagel, Tab (HU); Werner Diez, Tab (HU)

(73) Assignee: Flextronics International Kft., Tab (HU)

( * ) Notice: Subject to any disclaimer, the term of this patent is extended or adjusted under 35 U.S.C. 154(b) by 446 days.

(21) Appl. No.: 13/772,216

(22) Filed: Feb. 20, 2013

(65) Prior Publication Data

US 2013/0214595 A1   Aug. 22, 2013

(30) Foreign Application Priority Data

Feb. 20, 2012   (EP) .................................... 12156265

(51) Int. Cl.
| | |
|---|---|
| *B60R 22/00* | (2006.01) |
| *F02N 11/08* | (2006.01) |
| *B60R 16/03* | (2006.01) |
| *H02J 7/00* | (2006.01) |
| *F02N 11/10* | (2006.01) |

(52) U.S. Cl.
CPC .......... *F02N 11/0862* (2013.01); *B60R 16/03* (2013.01); *H02J 7/0036* (2013.01); *F02N 11/087* (2013.01); *F02N 11/10* (2013.01); *F02N 2011/0888* (2013.01); *F02N 2200/043* (2013.01); *F02N 2200/044* (2013.01); *F02N 2200/062* (2013.01); *F02N 2200/063* (2013.01)

(58) Field of Classification Search
CPC ..... B60R 16/03; F02N 11/0862; H02J 7/0036
USPC ........................................ 307/10.6; 290/38 R
See application file for complete search history.

(56) References Cited

U.S. PATENT DOCUMENTS

| | | |
|---|---|---|
| 5,155,374 A | 10/1992 | Shirata et al. |
| 5,907,194 A | 5/1999 | Schenk |
| 6,306,674 B1 | 10/2001 | Ruehle |
| 6,347,030 B1 | 2/2002 | Matsura |

(Continued)

FOREIGN PATENT DOCUMENTS

| | | |
|---|---|---|
| DE | 102008001332 A1 | 10/2009 |
| DE | 10 2009 047635 A1 | 2/2011 |

(Continued)

OTHER PUBLICATIONS

Mueller US PG Pub (20120035836 A1) has been provided as an english translation for WO 2010/078982 A1.*
International Search Report, PCT/EP2013052832, 3 pages.

*Primary Examiner* — Alfonso Perez Borroto
(74) *Attorney, Agent, or Firm* — Haverstock & Owens LLP

(57) ABSTRACT

A voltage stabilization device is proposed for use in a motor vehicle. The voltage stabilization device comprises a first terminal for connecting the device with an energy source, in particular to a vehicle battery; a second terminal for connecting the device having a starting device of a motor vehicle; a current limiter module for limiting a starting current; a control unit for controlling the current limiting module, and at a starting operation detector coupled with the control unit for detecting a starting operation, wherein the current limiting module carries out a starter current limiting action on the basis of a start signal of the process startup detector.

18 Claims, 1 Drawing Sheet

(56) References Cited

U.S. PATENT DOCUMENTS

| | | | |
|---|---|---|---|
| 6,718,927 B2* | 4/2004 | Goetze | H02J 7/0024 123/179.28 |
| 7,336,002 B2* | 2/2008 | Kato et al. | 307/10.6 |
| 7,432,613 B2* | 10/2008 | Jabaji et al. | 307/10.6 |
| 9,024,466 B2 | 5/2015 | Winkler et al. | |
| 2007/0018615 A1 | 1/2007 | Graf | |
| 2012/0032453 A1* | 2/2012 | Nakamura | 290/38 R |
| 2012/0035836 A1* | 2/2012 | Mueller | F02N 11/0866 701/113 |
| 2012/0060786 A1* | 3/2012 | Okada et al. | 123/179.5 |
| 2012/0075763 A1 | 3/2012 | Sieber | |
| 2012/0158274 A1 | 6/2012 | Ge et al. | |
| 2012/0186551 A1 | 7/2012 | Rentschler | |
| 2012/0200093 A1* | 8/2012 | Venkatasubramaniam et al. | 290/38 R |
| 2013/0066541 A1 | 3/2013 | Schueler et al. | |

FOREIGN PATENT DOCUMENTS

| | | | | |
|---|---|---|---|---|
| EP | 0 907 236 A2 | 7/1999 | | |
| EP | 0907236 A2 | 7/1999 | | |
| EP | 1883154 A1 | 1/2008 | | |
| JP | 2-25976 A | 10/1990 | | |
| JP | 2004-116296 A | 4/2004 | | |
| JP | 2008522575 A | 6/2008 | | |
| JP | 2009068426 A | 4/2009 | | |
| JP | 2010090874 A | 4/2010 | | |
| JP | 2011163122 A | 8/2011 | | |
| JP | 2011185260 A | 9/2011 | | |
| WO | WO 2010078982 A1 * | 7/2010 | | F02N 11/0866 |
| WO | 2010142373 A2 | 12/2010 | | |
| WO | WO 2010/142373 A2 | 12/2010 | | |
| WO | WO 2010/149416 A1 | 12/2010 | | |
| WO | WO 2011/015402 A1 | 2/2011 | | |
| WO | WO 2011018275 A1 * | 2/2011 | | |
| WO | WO 2011/120796 A1 | 10/2011 | | |

* cited by examiner

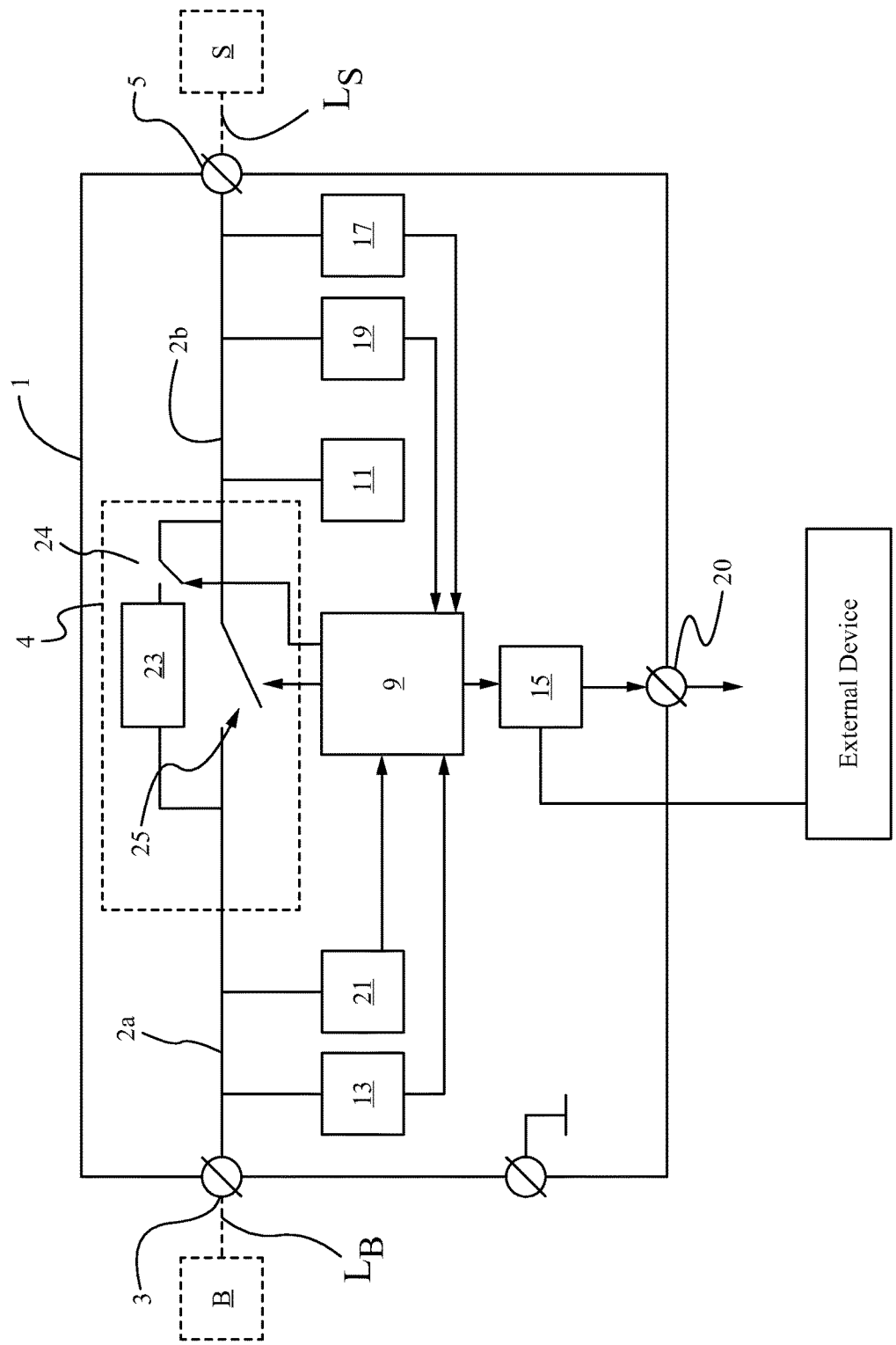

DEVICE FOR VOLTAGE STABILIZATION IN A MOTOR VEHICLE

RELATED APPLICATIONS

This application claims priority under 35 U.S.C. § 119(a) through (d) of the European Patent Application No. EP 12 156 265.6 filed Feb. 20, 2012, which is hereby incorporated by reference in its entirety.

BACKGROUND OF THE INVENTION

The invention relates to a device for voltage stabilization in a motor vehicle. More specifically, the invention relates to a device for stabilizing a motor vehicle electrical system during a starting process, which detects a voltage drop without the need for an external control signal and takes a voltage limiting action without a time delay.

Means for stabilizing a motor vehicle electrical system is known in principle. For a startup in a motor vehicle there is the fundamental problem that the starter of the vehicle requires a high current, which the starter takes from the vehicle battery. The high current draw by the starter leads to a voltage drop at the battery terminals, which results in a voltage drop across the electrical system. All electronic components and equipment of the motor vehicle are thus affected by such a voltage drop. The depth of a voltage drop, which must survive all the components connected to the electrical system and equipment without malfunction and undamaged, is specified by the manufacturers of the respective components. If the battery is weakly charged, damaged, or an old battery, the voltage drop may still be lower than the clamp voltage specified by the manufacturer. Such low voltage drops can cause malfunctions that can damage the on-board network connected components and devices. Therefore, it is necessary to limit a stress on the battery terminals to provide or limit the starter current so that the voltage at the battery terminals cannot fall below a predetermined threshold.

Known methods for stress relief on a battery can be essentially divided into passive and active methods. Passive means for limiting the voltage drop use resistors which are introduced between the battery and the starter to limit the starting current. Such passive methods are particularly easy to implement, but cause high energy losses and are relatively inflexible. Further, passive methods have to be tuned to a specific type of battery, and must therefore be redefined when changing the battery. Active voltage limiting methods typically use a pulse width modulation (PWM), in combination with resistors, semiconductors, and/or other components.

Regardless of the type of voltage drop limiting method, in the prior art, a voltage drop limiting action is initiated only when an on-board network detects the voltage drop. After detecting the voltage drop, the on-board network then sends a corresponding control signal to a device for stabilization of the motor vehicle electrical system, which consequently initiates an appropriate responsive action to limit the voltage. This measure is, for example, at the limit of the starter current and/or the activation of an additional energy source.

A disadvantage of the prior art devices is, thus, that a corrective action is only taken after the detection of a voltage drop in the electrical system, i.e. only in case of failure, and a message is sent to an on-board network and the responsive action is determined. The time period that elapses between detecting a voltage drop in the electrical system and the activating of a responsive voltage drop-limiting action may be sufficient to cause damage to the components and devices due to the voltage drop.

An object of the present invention is therefore to provide a device for stabilizing a motor vehicle electrical system during a starting process, which detects a voltage drop without the need for an external control signal. It is further an object of the present invention to automatically and immediately take an appropriate voltage limiting measure, without a time delay.

SUMMARY OF THE INVENTION

To solve the above-mentioned object, a device for stabilizing a motor vehicle electrical system during a starting process with the features of claim 1 is proposed.

The device for the voltage drop stabilization in a motor vehicle, according to the invention comprises: a first terminal configured for coupling the device to a power source, in particular a vehicle battery, a second terminal configured for coupling the device with a starting device of a motor vehicle, a current limiter module to limit a starter current, a control unit configured to control the current limiting module, and a starting operation detector for detecting a starting operation, wherein the control unit causes the current limiting module to carry out a starter current limiting action in response to a startup signal from the startup detector An essential point of the invention, then, is that a voltage limiting action is not only initiated when the voltage drop has occurred in the electrical system already, but a voltage drop is avoided from the outset or at least limited to an acceptable level. This is accomplished according to the invention in that the current limiting action is taken when a starting operation is detected, not only when a voltage drop is detected. In this manner a voltage drop in the electrical system will be limited from the beginning, since the voltage at the battery terminals at each time point is stabilized immediately upon detection of a starting process, not only when it is too late, i.e. already a serious voltage drop in the electrical system is present. A starting operation is automatically and immediately, without delay, and initiates a corresponding voltage drop-limiting action by the control unit. An additional power source can be switched in so that the battery terminal voltage cannot fall below a certain threshold.

Advantageously, the inventive device can be connected directly to the vehicle battery. Alternatively, the device can mounted on the starter. Due to the special design of the device as a compact module with only three connections required, there is no need to supply an external control signal or an external power supply. The device thus forms a self-contained system, which comprises all the necessary components in order to prevent a voltage drop in the electrical system. Characterized in that the device between the vehicle battery and the starter can be switched, a start operation may directly, i.e. without delay, be automatically detected and an appropriate countermeasure can be implemented immediately. The present invention may be affected by a particularly rapid responsive voltage drop-limiting measure (i.e., before there is a voltage drop) is taken and the much the vehicle electronics are spared from damage.

In contrast to the known wiring stabilizing systems, in the present invention the only connection terminals of the device are with the battery and the starter and a ground connection. In contrast, prior art systems require a considerable number of cables, for example, for the supply of an external control signal, which indicates a voltage drop in the electrical system.

The device for stabilization of a motor vehicle electrical system can further comprise a voltage sensor for detection of the voltage level of the battery. The voltage sensor can be connected, as required, both permanently and to detect the respective voltage level of the vehicle battery. In particular, the voltage sensor is suitable to determine whether the battery has a typical voltage of a vehicle battery with about 11 to 14 volts (V) or whether there is a Jump-start with increased voltage up to about 28V. Furthermore, the device for stabilizing a motor vehicle electrical system preferably includes a supply voltage generator for the power supply of the device components. The supply voltage from the battery voltage generator generates all necessary voltages for the correct function of the inventive device. Even very low voltage drops can be compensated. The supply voltage generator is preferably configured as an electronic circuit, which can operate both linear and clocked. It is understood that any other suitable circuit may be used as a supply voltage generator.

Preferably, the device of the invention has a control unit connected to the diagnostic feedback unit for detecting a short circuit and/or an interruption in the starter line. The diagnosis of the starter line can be (and usually is) performed by the controller by evaluating the voltage sensor. The diagnostic feedback unit is used for the transmission of the control diagnostic results. The diagnostic feedback unit may be formed in addition to the detection of the starting operation.

As indicated above, the control unit immediately conducts a voltage drop limiting measure after detection of a starting process. This voltage drop-limiting measure can be, as explained, passive or active in nature. A passive boundary of the starter current is basically achieved by a switch that couples a resistor between the battery and the starting device. An active limitation of the starter stream is accomplished actively by the control of the starter current. In the case of a passive output current limiting, i.e. a passive boundary of the starter current, a current sensor can be provided which communicates with the battery cable to the starter portion or line portion. The current sensor measurement signals can then be fed as additional information to the control unit. With an active limitation of the starter current, such a current sensor is important to allow an active control of the starter current or of the output current. A passive control of the output current or starter is provided, and it may be sufficient for a resistor to be switchably coupled between the first terminal and the second terminal. When the voltage sensor detects a starting operation, the control unit immediately switches the resistance between the first and the second terminal, and in this way limits the starter current.

To solve the above object, a motor vehicle with an inventive device, it is proposed to stabilize a motor vehicle electrical system during a starting process according to claim 13. In such a motor vehicle is preferably provided with the device connected between the vehicle battery and the starter device.

BRIEF DESCRIPTION OF THE DRAWINGS

FIG. 1 shows a schematic diagram of a device for the stabilization of a motor vehicle electrical system during a starting process in accordance of the invention.

DETAILED DESCRIPTION OF THE DRAWINGS

FIG. 1 shows a schematic diagram of a device 1 for the stabilization of a motor vehicle electrical system during a starting process in accordance of the invention. The device 1 has a first terminal 3 which is connected via a line $L_B$ to a power source, and in particular the vehicle battery B, of a motor vehicle connectable or connected. Furthermore, the device 1 has a second terminal 5 for connection of the device 1 with a starting device S of the motor vehicle via a line $L_S$. The vehicle battery B feeds both the starting device S as well as other components and devices of the motor vehicle electrical system. The first terminal 3 is coupled to a battery line portion 2a of the device 1, while the second terminal 5 is coupled to a starter line portion 2b of the device 1. The battery line portion 2a and starter line portion are coupled together through the current limiting module 4, which is thus connected in series between the first terminal 3 and the second terminal 5.

The device 1 can be configured as one, housed in a housing compact and separate unit which can be arranged, for example on a circuit board (PCB). The device 1 can then, by means of the terminals 3 and 5, be connected through lines $L_B$ and $L_S$ with the battery B and to the starter S. Basically, the device 1 can be arranged anywhere in the vehicle. Conceivably, for example, the device can be located in the trunk, if the vehicle battery B is there. The device 1 can also be attached directly to the battery B, or by a rigid mounting on the housing of the starter, S. The device 1 may be formed at least partially from plastic. Since the device 1 is at least temporarily exposed to high currents, preferably, a suitable cooling device, in particular in the form of a heat conductive material, in particular a metal plate or the like, is provided.

The device 1 comprises a start operation detector 17 which detects a starting operation, in particular by detecting the voltage or the current in the device 1, or in any other suitable manner. The detector 17 is coupled to the starter line portion 2b and to a control unit 9. Alternatively or in addition, the detector 17 is coupled to the battery line portion 2a and the control unit 9. The detector 17 detects the start operation by, for example, detecting the flow of current to the starter line section 2b and/or the battery line portion 2a, or detecting a voltage corresponding to the current. The control unit 9 detects the start operation from detector 17. The control unit 9 in turn acts together with the current limiting module 4, so that in case a voltage drop is detected by the detector 17, the current limiting module 4 is activated by the control unit 9.

Furthermore, the device may have one or more additional circuit elements, such as a voltage sensor 11, a current sensor 19, and a diagnosis feedback unit 15. The voltage sensor 11 and the current sensor 19 are coupled to the starter line section 2b, as shown in FIG. 1, or alternatively coupled to the battery line portion 2a. In addition, the additional elements 11, 15, and 19 are coupled to the control unit 9 to fulfill various additional functions. For example, the voltage sensor 11 may be a simple voltage divider and can further comprise a switch to switch in additional switching elements such as transistors, in particular MOSFETs or the like. The control unit 9 may also evaluate the voltage sensor 11, and thus serves for the diagnosis of the electrical connection between the battery, B, and the starter, S. The diagnostic result is preferably transmitted to the diagnostic feedback unit 15. The current sensor 19 is particularly necessary if an active limitation of the starter current is carried out by an appropriate regulation. The control is taken over by the control unit 9. If a passive boundary of the starter current is provided, the current sensor 19 may still be provided in order to provide additional information to the control unit 9.

On the input side, the device 1 may further comprise a second voltage sensor 21 that is connected between the first terminal 3 and the control unit 9. The second voltage sensor 21 at the input of the device 1 provides information to the control unit 9, which allows a conclusion as to whether a standard car battery with a voltage range of 11 to 14 volts, or a "Jump-start" with up to 28 volts, is present. Since voltages are defined differently in a Jump-start, they can even exceed a voltage of 30V. Depending on the battery voltage then, different actions by the control unit 9 are introduced to prevent a voltage drop in the electrical system.

The device 1 further comprises a power supply voltage generator 13, which supplies all of the components of the device 1 with the required voltage. The supply voltage generator 13 is designed so that it can also compensate for a low voltage drop at the terminals of the vehicle battery B and the components of the device 1 can therefore reliably provide the required voltage at all times. The supply voltage generator 13 thus forms an internal power source and an internal energy converter, which supplies the device 1, and in particular the starting operation detector 17, the control unit 9 and the current limiting module 4 with energy, so that the system functions independent of the external components.

The device 1 may further comprise the diagnostic feedback unit 15, which serves as an interface for transmission of the diagnostic results of the control unit 9 to an external device. The diagnostic feedback unit 15 therefore serves as an interface, which routes error information to other vehicle control devices. The diagnostic feedback unit 15 is connected to a third terminal, namely the ground terminal 20, and can route the diagnostic results of the control unit 9, in particular the recognition of a short circuit on the starter line section 2b or the battery cable portion 2a, an interruption of the lines and/or a start operation. The ground terminal 20 may also be connected directly to the control unit 9, or other component of the device 1, if a diagnosis response unit 15 is not provided in an embodiment of the device 1.

The control unit 9 is used in particular for the initiation of an action for limiting the voltage drop at the battery terminals, which is accomplished in the illustrated embodiment, by a limitation of the current required by the starter (also called starter current or output current). In the FIGURE, the device 1 or the current limiting module 4 of the device 1 is switchably coupled to a resistor 23 through a switching element 24, which is to limit the passive starter stream in series between the first terminal 3 and the second terminal 5. The switching element 24 is controlled by the control unit 9. The switching element 24 may be formed as a transistor, in particular as a MOSFET or a like switching element. The control unit 9 comprises a control circuit and in particular may comprise a microprocessor.

The device 1 further comprises a switch 25 which can be constructed electronically or mechanically, and can interrupt a direct connection between the starter line portion 2b and the battery cable portion 2a between the terminals 5 and 3, respectively. The switch 25 is actuated by the control unit 9. With an open switch 25 and a closed switching element 24 of the current in the device 1, the battery B becomes diverted through the resistor 23 to the starter S, so that a current flow is effectively reduced. If the switch 25 is closed, however, and the switching element 24 is opened, a current flow takes place directly from the battery B to the starter S via the starter line 2a and the battery portion 2b line section.

In the embodiment shown in the FIG. 1, in which the current limiting module 4 limits the current flow through a resistor 23, the current sensor 19 is not absolutely necessary. However, the data measured by the current sensor 19 is used as additional information routed to, and processed by, the control unit 9. Alternatively or additionally, an active current control can be provided, in which the resistor 23 has to be not provided in the current limiting module 4. In this case, an active control of the starter current is effected by the control unit 9 with the aid of the current sensor 19, for example in the manner of a DC/DC conversion.

In the following the function of the inventive device 1 will be explained in more detail. Once the start operation is detected by the start operation detector 17, and the switching element 24 is opened, switch 25 is closed, the start operation detector 17 generates a corresponding signal and passes it to the control unit 9. The start operation detector 17 activates the control unit 9 thus, in other words, the control unit 9 is awakened by the signal of the starting operation detector 17. The output of the start operation detector is preferably digital. The control unit 9 then controls the current limiting module 4 and consequently activates a passive or active current limiting mechanism, causing the current to immediately flow from the battery B to the starter S immediately limited by the closing of the switching element 24 the opening of the switch 25. Thus, the voltage drop at the battery terminal 3, and thus a voltage drop across the board system is reliably prevented or at least limited to a certain acceptable minimum voltage.

As described above, depending on the nature of the proposed current-limiting measure (passive or active) either a serial resistor 23 is switched on for a certain time (passive limitation), or there is an active current limiting, for example, by means of a DC/DC converter to control the starter stream.

The device 1 is continuously monitored, and without the need of an external activation signal, the initiator, and preferably also the battery status, provided that a voltage sensor is provided. The device 1 detects automatically by start operation detector 17, without having to rely on an external activation signal that a start operation is present and thus a voltage drop in the electrical system is imminent. The voltage drop-limiting action is taken immediately.

Control devices are usually in vehicles designed to withstand voltage drops at the battery terminals up to 9V and operate correctly up to this voltage. New batteries do enable higher starting currents with smaller voltage drops, but require newly developed starter significantly more power from the vehicle battery, which is caused by the need to speed up the startup process, such as in start-stop operation in city traffic. This in turn leads to lower voltage drops to the battery terminals, and thus in the electrical system. Newer vehicles are often equipped with older, lower voltage, fixed control devices that do not prevent the unacceptable voltage drop in all cases. In a preferred embodiment, a voltage drop at the battery terminals is limited to approximately 9V. However, it is conceivable to define this lower limit even lower.

The device for automatic stabilization of a motor vehicle electrical system according to the present invention, is not limited to start/stop systems in motor vehicles. Rather, the device of the present invention also protects vehicles without start/stop system such as avionics. The device 1 provides minor, barely perceptible delays during start-up operation voltage drops.

Overall, the present device for stabilizing a motor vehicle electrical system allows for a automatic detection of the startup process and thus allows the direct introduction of measures to limit voltage drop. Thus, no need for an external control signal, which tells a voltage drop in the electrical system. An impending voltage drop can therefore be detected almost without delay and increased reliability, so that both the vehicle battery and the vehicle electronics are protected.

REFERENCE LIST

1 Device for stabilizing a motor vehicle electrical system
2a Battery line section
2b Starter line section
3 First terminal
4 Current limiter module
5 Second terminal
9 Control unit
11 Voltage sensor
13 Supply voltage generator
15 Diagnostic feedback unit
17 Start operation detector
19 Current sensor
20 Ground terminal
21 Voltage sensor
23 Resistance
25 Switch
B Battery
S Starter
LB line
LS line

What is claimed is:

1. A device for stabilizing the electrical system of a motor vehicle responsive to a voltage drop comprising:
   a first terminal configured to couple the device with an energy source, wherein the energy source comprises a vehicle battery;
   a second terminal configured to couple the device to a starting device of a motor vehicle;
   a current limiting module configured to limit a starting current;
   a control unit configured to control the current limiting module;
   a power line directly connecting the first terminal and second terminal via the current limiting module, wherein the current limiting module comprises a primary power line portion having a primary switch and a secondary power line portion having a secondary switch coupled with a resister in serial; and
   a starting operation detector coupled with the power line and the control unit, wherein the primary switch turns to an open state and the secondary switch turns to a closed state limiting a starter current in response to the starting operation detector detecting a flow of the starter current to at least a portion of the power line and, in return, activating the control unit to control the current limiting module to carry out a starter current limiting action, wherein the primary switch is coupled parallel to the secondary switch.

2. The device of claim 1, wherein the first terminal is coupled to a battery line portion and the second terminal is coupled to a starter line portion.

3. The device of claim 2, wherein the battery line portion is coupled with the starter line portion through the current limiting module.

4. The device of claim 2, further comprising a voltage sensor configured to detect a voltage level of the vehicle battery.

5. The device of claim 1, further comprising a supply voltage generator configured to provide a voltage supply of a device component.

6. The device of claim 2, further comprising a diagnostic unit coupled to the control unit, wherein the diagnostic unit is configured to detect one of: a short circuit and an interruption of the starter line portion.

7. The device of claim 6, wherein the diagnostic unit is further coupled to a ground terminal.

8. The device of claim 2, wherein the starter current limiting action comprises coupling a resistor between the battery line portion and the starter line portion.

9. The device of claim 1, wherein the starter current limiting action comprises active control of the starter current.

10. The device of claim 4, characterized in that the current limiting action comprises limiting a voltage drop to not less than 9V as detected by the voltage sensor.

11. The device of claim 1, further comprising a current sensor coupled to the control unit, wherein the current limiting action is taken in response to a start operation detected and a drop in current detected by the current sensor.

12. The device of claim 1, wherein the primary switch, when opened, couples the resistor that is coupled between the first terminal and the second terminal, and wherein the primary switch is operably coupled to the control unit.

13. A motor vehicle comprising a device for stabilizing the electrical system of the motor vehicle responsive to a voltage drop, the device comprising:
   a first terminal configured to couple the device with an energy source, wherein the energy source comprises a vehicle battery;
   a second terminal configured to couple the device to a starting device of a motor vehicle;
   a current limiting module configured to limit a starting current;
   a control unit configured to control the current limiting module;
   a power line directly connecting the first terminal and second terminal via the current limiting module, wherein the current limiting module comprises a primary power line portion having a primary switch and a secondary power line portion having a secondary switch coupled with a resister in serial; and
   a starting operation detector coupled with the power line and the control unit, wherein the primary switch turns to an open state and the secondary switch turns to a closed state limiting a starter current in response to the starting operation detector detecting a flow of the starter current to at least a portion of the power line and, in return, activating the control unit to control the current limiting module to carry out a starter current limiting action, wherein the primary switch is coupled parallel to the secondary switch.

14. The motor vehicle of claim 13, wherein the device is coupled between the vehicle battery and the starting device.

15. The motor vehicle of claim 13, wherein the device is coupled to one of: the vehicle battery and the starting device.

16. The motor vehicle of claim 13, wherein the power line includes a battery line portion coupled with the first terminal and a starter line portion coupled with the second terminal, wherein a section of the battery line portion and a section of the starter line portion are a part of the current limiting module.

17. The motor vehicle of claim 16, wherein the device further comprises, at an output side of the device:
   a first voltage sensor coupled to the starter line portion and the control unit;
   a current sensor coupled to the starter line portion and the control unit; and a diagnostic feedback unit coupled to the control unit to receive therefrom diagnostic result and to forward the diagnostic result to an external device which the diagnostic feedback unit interfaces with.

18. The motor vehicle of claim 17, wherein the device further comprises, at an input side of the device:
a second voltage sensor coupled to the battery line portion and the control unit; and
a voltage generator coupled to the battery line portion and the control unit.

* * * * *